Feb. 5, 1935.　　　C. E. SWENSON　　　1,989,832
UNIVERSAL JOINT
Filed June 16, 1933
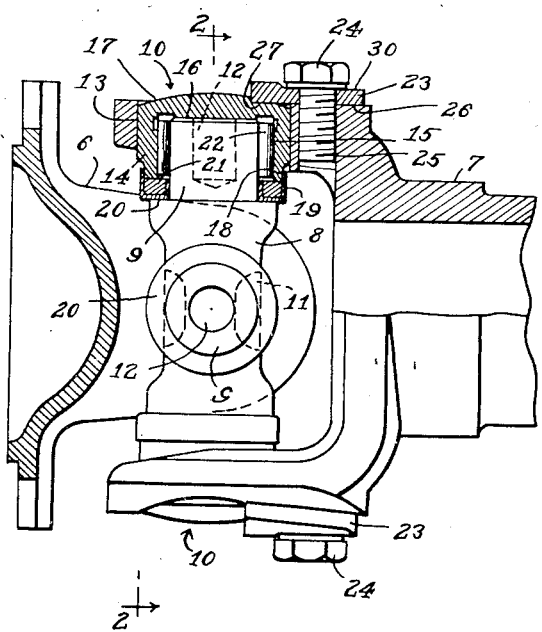
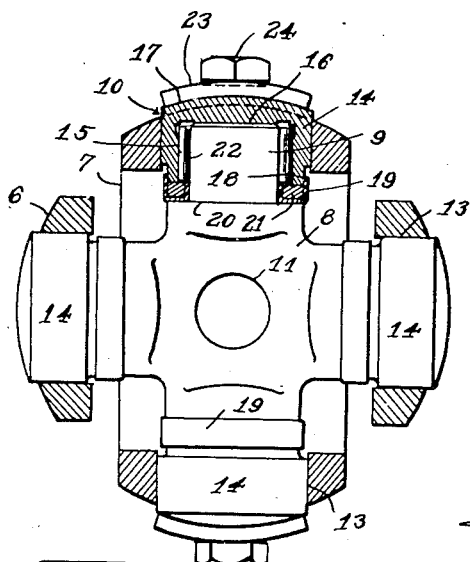
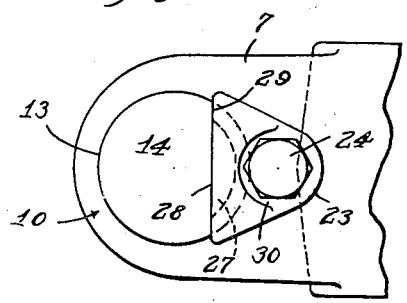
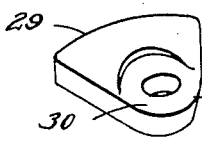
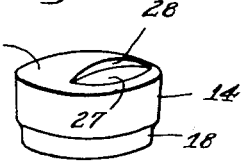
Inventor:
Carl E. Swenson
By
Wilson, Dowell, McCanna & Wintercorn
Attys.

Patented Feb. 5, 1935

1,989,832

UNITED STATES PATENT OFFICE 1,989,832

UNIVERSAL JOINT

Carl E. Swenson, Rockford, Ill., assignor to Mechanics Universal Joint Company, Rockford, Ill., a corporation of Illinois Application June 16, 1933, Serial No. 676,202

2 Claims. (Cl. 64—102)

This invention relates to trunnion type universal joints adapted for use on motor vehicles.

The principal object of my invention is to provide a universal joint of very low cost, although it embodies roller bearings for the trunnions to insure smooth and easy operation and long life. The economy in construction, in accordance with this invention, comes as a result of designing the joint so that the bearing parts may be produced on automatic screw machines and punch presses.

Another important object consists in the provision of a universal joint in which the bearings are in the form of cups adapted to have a snug fit in holes provided therefor in the yoke members, and to be fastened in place by means of small retainer plates having abutment with the outer ends of the cups and secured each by a single cap screw for quick assembly and all-around economy, while providing a solid mounting for the bearings to eliminate play and produce a joint in which the bearings once assemb'ed need never be removed for oiling or inspection throughout the life of the car, the requisite amount of lubricant being supplied at the time of assembling and being protected by retainers against loss or contamination to afford proper lubrication.

The invention is illustrated in the accompanying drawing, in which—

Figure 1 is a side view of a universal joint made in accordance with my invention but showing the left hand yoke broken away to show one of the trunnions without a bearing thereon and showing the upper half of the other yoke, including one of the bearings, in longitudinal section;

Fig. 2 is a transverse section on the broken line 2—2 of Figure 1;

Fig. 3 is a plan view of one of the trunnion bearings, and

Figs. 4 and 5 are perspective views of a bearing cup and the retainer plate therefor, respectively.

The same reference numerals are applied to corresponding parts throughout the views.

The present invention, as indicated above, is primarily concerned with the construction and mounting of the bearings which provide radial and end thrust bearing support for the trunnions. It is unnecessary, therefore, to describe in detail the rest of the joint other than to state that it is of the trunnion type and comprises a pair of yokes or terminal coupling members 6 and 7 connected by means of an intermediate transmission member 8, sometimes referred to as the spider, the same providing four trunnions 9, 90° apart. The trunnions are received in bearings, indicated generally by the numeral 10, each yoke being equipped with one pair of these bearings. The yokes are, of course, suitably connected to driving and driven members. The bearings 10, as will soon appear, are so designed and constructed that they can be charged with the proper amount of lubricant at the time they are assembled on the trunnions and they will not require any further attention in service, the lubricant being retained and protected from contamination so that the bearings are properly lubricated at least until such time as it may be necessary to replace the lubricant retaining washers. The spider 8 is forged with central depressions 11 in opposite sides thereof principally to save in material, and incidentally lighten the construction. The radial holes 12 in the center of the trunnions serve to pocket a certain amount of lubricant at the time the bearings are assembled on the trunnions to make up any deficiency in lubricant in the bearings and thus insure proper lubrication.

The yokes 6 and 7 have radial holes 13 provided in exact alignment with each other in the two arms of each yoke. The bearings 10 are in the form of cups 14 so as to fit over the trunnions and enter the holes 13 with a snug fit, the side walls of each bearing cup having accurately finished inside surfaces 15 adapted to provide radial bearing support for the trunnion disposed therein, and the end wall having an accurately finished inside surface 16 adapted to provide end thrust bearing support by engagement of the end of the trunnion thereon. It is intended that the bearing cups 14 will be produced on a screw machine for quantity production at low cost and will be made from bar stock of approximately the same outside diameter as the completed bearing cups, allowing enough for finish grinding after hardening, whereby to minimize machining operations and make a proportionate saving in cost. Outside of the machining of surfaces 15 and 16, there remains only the facing off flatly of the inner end, as shown, and the facing off to a rounded or spheroidal form of the outer end, as indicated at 17, in cutting the part off the bar. All of this work can be done accurately enough for the present purposes on a screw machine. At the same time that the inner end is faced off, this end is cut down to a smaller diameter, as indicated at 18, to fit into a sheet metal retainer ring 19. The ring 19 is of channel-shaped cross-section with the outer flange thereof adapted to have a working fit on the reduced end of the bearing cup, as stated, and with the inner flange adapted to have a press fit on the trunnion. There is a flat annular seat 20 around the base of each trunnion which the retainer ring engages. A composition cork packing ring 21 fitting in the retainer ring 19 engages the inner end of the bearing cup to seal the bearing against loss of lubricant and also protect the lubricant against contamination. The bearings, it will be observed, are not plain journal bearings but have anti-friction rollers 22 provided therein to make for easier and smoother operation and consequently more efficient power transmission and longer life. It is found that a universal joint with roller type bearings keeps cool in operation so that the lubricant sees light service and lasts indefinitely. The rollers of course, roll on the outside of the trunnion and on the inside surface 15 of the bearing cup. It will be observed that these rollers are flat on the ends and are so short that they may be placed in the bearing cup after the retainer is applied to the outer end, just before the bearing cup is slipped over the trunnion in assembling the bearing on the joint. It is found that when cup grease, or any similar heavy or semi-fluid lubricant, is employed, the lubricant spread on the inside of the cup serves to hold the rollers in place securely enough for assembling purposes.

The bearings 10 are held in assembled posiion by retainer plates 23 of stamped sheet metal fastened in place on the yokes each by a single cap screw 24 threaded in a radial hole 25 in the yoke. The plates 23 are of arcuate form to fit the accurately machined arcuate seats 26 provided therefor on the yoke. An arcuate shoulder 27 is ground on the same radius as the seat 26 in the outer end of each bearing cup 14 for engagement of the retainer plate 23. In the grinding of the shoulder 27, another shoulder 28 is produced in a vertical plane which is straight and is arranged to be engaged by the straight edge 29 of the retainer plate 23 so as to hold the bearing cup against turning in the yoke. Now, it is, of course, important that the shoulder 27 be ground deep enough so that the tightening of the screw 24 will not cause the bearing cup to bind on the trunnion, and, on the other hand, it is important that the shoulder should not be ground too deep and thus allow the trunnion to have excessive end play with respect to the bearing cup. The proper mean depth of cut is assured when the shoulders 27 are ground similarly as described in my earlier application, Serial No. 615,496. In accordance with that method, the yokes 6 and 7 are first of all turned to produce the seats 26 on a predetermined outside diameter, bearing a predetermined relation to the dimension from the end of one trunnion 9 of the spider to the end of the opposite trunnion, and then the bearing cups 14 are placed on a spider type fixture having radial posts substantially corresponding to the trunnions 9 for support of the bearing cups at substantially the proper radius with respect to the axis of rotation, making allowance for the working clearance between the end of the trunnion and the end thrust bearing surface. Then, while the bearing cups are suitably held and the fixture is revolved, a grinding wheel that is suitably driven is fed toward the work carefully to grind the shoulders 27 to the exact depth desired, down to a diameter approximately equal to the diameter of the seats 26. In that way, when the bearings are finally assembled on the joint the screws 24 can be tightened to clamp the plates 23 to the seats 26 without danger of jamming the bearing cups on the trunnions nor, on the other hand, leaving the bearing cups so loose that the trunnions do not find proper end thrust bearing support. In other words, with the bearings tightened there should and will be just working clearance between the ends of the trunnions and the end thrust bearing surfaces 16 to make for smooth and quiet operation and minimum wear. In the punching of the retainer plates 23, it is also preferred to form a flat seat on the top surfaces thereof, as at 30, for the engagement of the heads of the cap screws 24.

It is believed the foregoing description conveys a good understanding of all of the objects and advantages of my invention. The appended claims have been drawn so as to cover all legitimate modifications and adaptations.

I claim.

1. In universal and pivotal joints, the combination of a bifurcated yoke member the two arms of which are opposed bearing supports, a trunnion member having opposed trunnions for entry in bearings on said supports, said supports having aligned radial holes, a cup shaped bearing received in each of said holes and fitting on the trunnions with the end walls thereof abutting the ends of the trunnions to provide end thrust support, the yoke arms having concentric arcuate seats provided thereon transversely thereof on a certain radius relative to the dimension from the end of one trunnion to the end of the opposed trunnion, the outer ends of the bearing cups adjacent said seats having arcuate shoulders formed thereon of the same radius as and in the same plane with said seats, and an arcuate shaped retainer plate secured on each of said seats and engaging the related shoulder on the adjacent bearing cup.

2. A structure as set forth in claim 1 wherein the shoulder on the bearing cup has a riser defining the side thereof remote from the seat, and said plate having the end thereof adapted to abut said riser whereby to hold said bearing cup against turning in the hole in the yoke arm.

CARL E. SWENSON.